United States Patent
Hsieh et al.

(10) Patent No.: US 9,357,559 B1
(45) Date of Patent: May 31, 2016

(54) LONG TERM EVOLUTION BASE STATION AND WIRELESS RESOURCE SCHEDULING METHOD THEREOF

(71) Applicant: Institute For Information Industry, Taipei (TW)

(72) Inventors: Hsiang-Chin Hsieh, New Taipei (TW); Yuan-Yao Shih, Taipei (TW); Chih-Chiang Kuo, Tainan (TW); Ai-Chun Pang, New Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/598,752

(22) Filed: Jan. 16, 2015

(30) Foreign Application Priority Data

Dec. 1, 2014 (TW) .............................. 103141579 A (51) Int. Cl.
*H04W 72/00* (2009.01)
*H04W 72/12* (2009.01)
*H04W 4/00* (2009.01)

(52) U.S. Cl.
CPC .......... *H04W 72/1257* (2013.01); *H04W 4/005* (2013.01)

(58) Field of Classification Search
CPC ............ H04L 27/2662; H04L 27/2678; H04L 27/2688; H04L 1/20; H04L 1/248; H04L 1/16; H04L 7/00; H03M 2201/196; H03M 2201/3105; H03M 2201/1127; H03M 3/042; H04J 3/07; H04J 1/06; H04J 1/14; H04J 3/1688; H04W 72/042; H04W 72/0413; H04W 88/08; H04W 88/02; H04W 72/0406; H04W 72/0453; H04W 72/0446; H04W 72/082; H04W 24/10; H04W 72/12; H04W 72/044; H04W 36/30; H04W 72/1289; H04W 28/08; H04W 28/18

See application file for complete search history.

(56) References Cited

U.S. PATENT DOCUMENTS

| | | | | |
|---|---|---|---|---|
| 2009/0129326 A1* | 5/2009 | Kim | .......................... | H04L 47/10 370/329 |
| 2009/0249153 A1* | 10/2009 | Zhang | ................... | H04L 1/1887 714/748 |
| 2009/0287976 A1* | 11/2009 | Wang | .................... | H04L 1/1812 714/748 |

* cited by examiner

*Primary Examiner* — Nimesh Patel
(74) *Attorney, Agent, or Firm* — Skaar Ulbrich Macari, P.A.

(57) ABSTRACT

A long term evolution (LTE) base station and wireless resource scheduling method thereof are provided. The LTE base station receives a transmission period, a tolerable time shift, a start transmission time instant, and a required resource amount from each of a plurality of machine type communication apparatuses. The LTE base station decides a scheduling time length according to the transmission periods, decides a scheduling interval according to a start scheduling time instant and the scheduling time length, decides at least one transmission time instant for each machine type communication apparatus according to the transmission periods, the tolerable time shifts, the start transmission time instants, and the required resource amounts, and transmits each of the at least one transmission time instant to the corresponding machine type communication apparatus so that each of the machine type communication apparatus transmits data according to the corresponding at least one transmission time instant.

18 Claims, 4 Drawing Sheets

LONG TERM EVOLUTION BASE STATION AND WIRELESS RESOURCE SCHEDULING METHOD THEREOF

PRIORITY

This application claims priority to Taiwan Patent Application No. 103141579 filed on Dec. 1, 2014, which is hereby incorporated herein by reference in its entirety.

FIELD

The present invention relates to a Long Term Evolution (LTE) base station and a wireless resource scheduling method thereof; in particular, the present invention relates to an LTE base station and a wireless resource scheduling method thereof for scheduling a plurality of machine type communication (MTC) apparatuses.

BACKGROUND

With the rapid development of science and technologies, wireless network communication technologies have advanced to the generation of Long Term Evolution (LTE). According to the specifications of the LTE standard, an MTC apparatus (e.g., a smart electricity meter, various kinds of sensors, and etc.) with data that needs to be uploaded to an LTE base station must request a resource from the LTE base station via a contention-based random access procedure. When a large amount of MTC apparatuses in the LTE network have data to be uploaded to the LTE base station at the same time, the random access channel (RACH) in the control plane of the LTE network can become congested.

From the technical document No. TR 37.868 issued by the Third Generation Partnership Project (3GPP), for smart energy saving applications, one LTE base station serves more than 30,000 smart electricity meters in the suburban area of London on average. Furthermore, for taxi management applications, there are about 72 random access channel instructions per second around Beijing Capital International Airport. This means that each transmission request needs 36 preambles on average to be successfully accepted. By using conventional transmission mechanisms designed by the LTE standards for MTC apparatuses, the presence of numerous MTC apparatuses within the coverage of an LTE base station would cause a high collision probability, too many random access channel instructions, and a time delay.

Accordingly, there is still an urgent need for a wireless resource scheduling and transmission mechanism for MTC apparatuses conforming to the LTE standards.

SUMMARY

An objective of the present invention includes providing a Long Term Evolution (LTE) base station. The LTE base station in certain embodiments comprises a transceiver and a processor, wherein the transceiver and the processor are electrically connected with each other. The transceiver is wirelessly connected to a plurality of Machine Type Communication (MTC) apparatuses. The transceiver receives a transmission period, a tolerable time shift, a start transmission time instant, and a required resource amount from each of the MTC apparatuses. The processor decides a scheduling interval length according to the transmission periods and decides a scheduling interval according to a start scheduling time instant and the scheduling interval length. The processor decides at least one transmission time instant within the scheduling interval for each of the MTC apparatuses according to the transmission periods, the tolerable time shifts, the start transmission time instants, and the required resource amounts. The transceiver transmits each of the at least one transmission time instants to the corresponding MTC apparatus so that each of the MTC apparatuses transmits a datum according to the corresponding at least one transmission time instant within the scheduling interval.

Another objective of the present invention includes providing a wireless resource scheduling method for use in an LTE base station. The LTE base station is wirelessly connected to a plurality of MTC apparatuses. In certain embodiments the wireless resource scheduling method comprises the following steps: (a) receiving a transmission period, a tolerable time shift, a start transmission time instant, and a required resource amount from each of the MTC apparatuses, (b) deciding a scheduling interval length according to the transmission periods, (c) deciding a scheduling interval according to a start scheduling time instant and the scheduling interval length, (d) deciding at least one transmission time instant within the scheduling interval for each of the MTC apparatuses according to the transmission periods, the tolerable time shifts, the start transmission time instants, and the required resource amounts, and (e) transmitting each of the at least one transmission time instants to the corresponding MTC apparatus so that each of the MTC apparatuses transmits a datum according to the corresponding at least one transmission time instant within the scheduling interval.

For a plurality of MTC apparatuses served by an LTE base station, the present invention schedules the wireless resources in advance according to the transmission periods, the tolerable time shifts, the start transmission time instants, and the required resource amounts of the MTC apparatuses. Then, the MTC apparatuses transmit data according to the result of wireless resource scheduling. Since the present invention schedules the wireless resources for the MTC apparatuses in advance, the MTC apparatuses does not have to request resources from the LTE base station via a contention-based random access procedure. Hence, the present invention overcomes the shortcomings of the prior art.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the LTE base station and the wireless resource scheduling method thereof according to the present invention will be explained with reference to example embodiments thereof. However, these example embodiments are not intended to limit the present invention to any specific examples, embodiments, environment, applications, or particular implementations described in these embodiments. Therefore, the descriptions of these example embodiments is only for purpose of illustration rather than to limit the present invention. It should be appreciated that elements unrelated to the present invention are omitted from depiction in the following embodiments and the attached drawings.

Figure 1A:
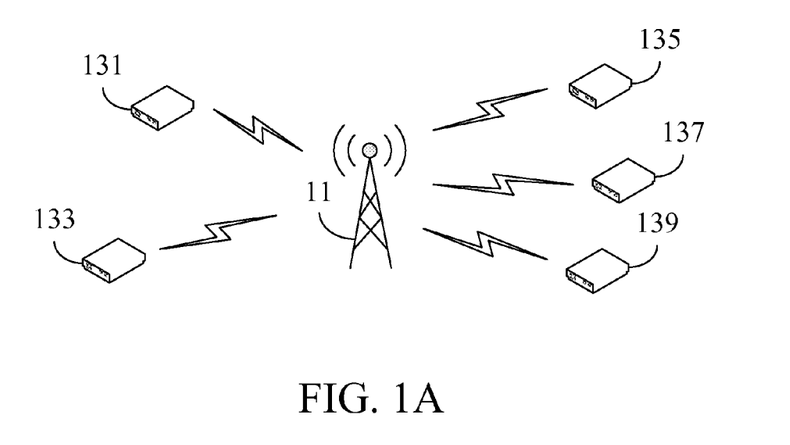
FIG. 1A depicts a schematic view of an LTE wireless network system 1 according to a first embodiment and second embodiment of the present invention.
Figure 1B:
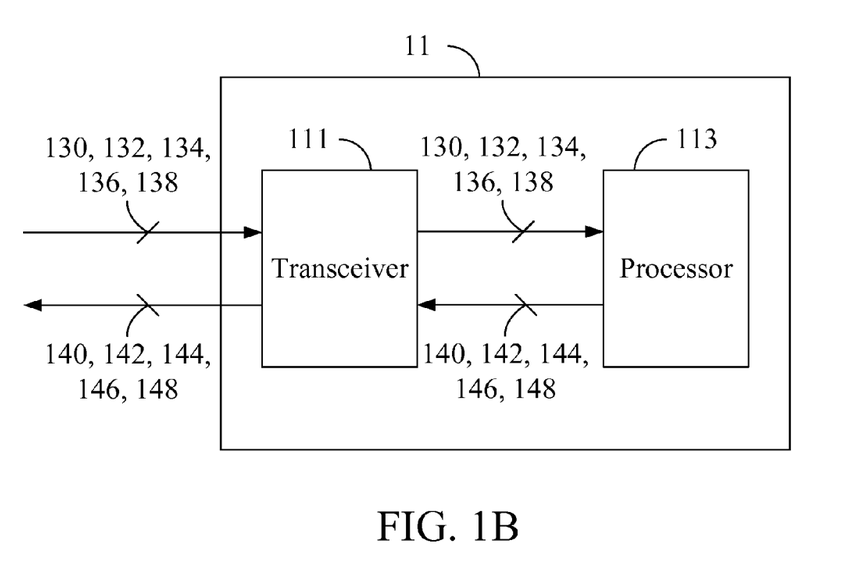
FIG. 1B depicts a schematic structural view of the LTE base station 11.

The first embodiment of the present invention is an LTE wireless network system 1; a schematic view of which is depicted in FIG. 1A. The LTE wireless network system 1 comprises an LTE base station 11 and a plurality of MTC apparatuses 131, 133, 135, 137, 139. The MTC apparatuses 131, 133, 135, 137, 139 are wirelessly connected to the LTE base station 11. It should be appreciated that the present invention has no limitation on the number of the MTC apparatuses that can be wirelessly connected to an LTE base station, although five MTC apparatuses 131, 133, 135, 137, 139 are depicted in FIG. 1A. FIG. 1B depicts a schematic structural view of the LTE base station 11. The LTE base station 11 comprises a transceiver 111 and a processor 113, wherein the transceiver 111 is electrically connected to the processor 113. The transceiver 111 may be any interface that can wirelessly receive and transmit a signal/datum, while the processor 113 may be any processor, central processing unit (CPU), microprocessor, or other computing apparatus well known to people of ordinary skill in the art.

Figure 1C:
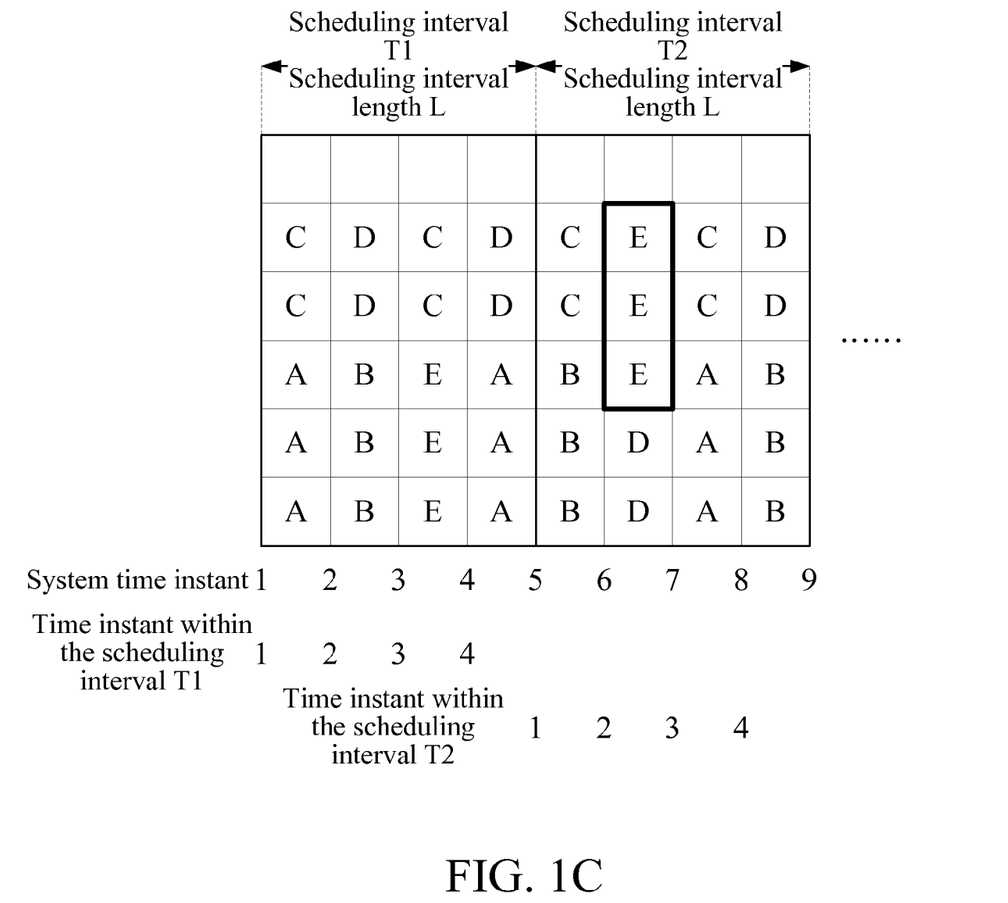
FIG. 1C depicts resources provided by the LTE base station 11.

FIG. 1C depicts the resources provided by the LTE base station 11, where the horizontal axis represents time and each square represents a resource block. According to the content depicted in FIG. 1C, the LTE base station 11 provides six resource blocks at each time instant (e.g., system time instants 1, 2, 3, 4, 5, 6, 7, 8). People of ordinary skill in the art shall understand that the form of the resources provided by the LTE base station 11 is not limited to the resource block and the number of the resources provided by the LTE base station 11 at each time instant is not limited to six.

The MTC apparatuses 131, 133, 135, 137, 139 have to transmit data to the LTE base station 11 periodically and each transmission time instant is allowed to be shifted within a certain degree. In other words, each of the MTC apparatuses 131, 133, 135, 137, 139 has a transmission period (not depicted) and a tolerable time shift (not depicted). Additionally, each of the MTC apparatuses 131, 133, 135, 137, 139 has a start transmission time instant (not depicted) and a required resource amount (not depicted). For example, for the MTC apparatus 131, the transmission period is three time units, the tolerable time shift is one time unit before and after a transmission time instant, the start transmission time instant is the system time instant 1, and the required resource amount is three resource blocks. For the MTC apparatus 133, the transmission period is three time units, the tolerable time shift is one time unit before and after a transmission time instant, the start transmission time instant is the system time instant 2, and the required resource amount is three resource blocks. For the MTC apparatus 135, the transmission period is two time units, the tolerable time shift is two time units before and after a transmission time instant, the start transmission time instant is the system time instant 1, and the required resource amount is two resource blocks. For the MTC apparatus 137, the transmission period is two time units, the tolerable time shift is two time units before and after a transmission time instant, the start transmission time instant is the system time instant 2, and the required resource amount is two resource blocks. For the MTC apparatus 139, the transmission period is four time units, the tolerable time shift is one time unit before and after a transmission time instant, the start transmission time instant is the system time instant 3, and the required resource amount is three resource blocks.

Each of the MTC apparatuses 131, 133, 135, 137, 139 transmits the transmission period, the tolerable time shift, the start transmission time instant, and the required resource amount to the LTE base station 11. The transceiver 111 receives the transmission periods, the tolerable time shifts, the start transmission time instants, and the required resource amounts from the MTC apparatuses 131, 133, 135, 137, 139. For example, the MTC apparatuses 131, 133, 135, 137, 139 may transmit the signals 130, 132, 134, 136, 138 to the LTE base station 11 respectively. The signal 130 comprises the transmission period, the tolerable time shift, the start transmission time instant, and the required resource amount of the MTC apparatus 131. The signal 132 comprises the transmission period, the tolerable time shift, the start transmission time instant, and the required resource amount of the MTC apparatus 133. The signal 134 comprises the transmission period, the tolerable time shift, the start transmission time instant, and the required resource amount of the MTC apparatus 135. The signal 136 comprises the transmission period, the tolerable time shift, the start transmission time instant, and the required resource amount of the MTC apparatus 137. The signal 138 comprises the transmission period, the tolerable time shift, the start transmission time instant, and the required resource amount of the MTC apparatus 139. The transceiver 111 receives the signals 130, 132, 134, 136, 138 and transmits them to the processor 113 for further processing.

The processor 113 decides a scheduling interval length L according to the transmission periods of the MTC apparatuses 131, 133, 135, 137, 139. For example, in this embodiment, the processor 113 may decide that the scheduling interval length L is equal to the greatest transmission period (i.e., four time units). It shall be appreciated that the present invention has no limitation on the specific value of the scheduling interval length L. It is noted that if the scheduling interval length L is set to not be smaller than the greatest transmission period, each of the MTC apparatuses 131, 133, 135, 137, 139 will be considered by the processor 113 when scheduling the wireless resources for each scheduling interval that is decided according to the scheduling interval length L.

Next, the processor 113 decides a scheduling interval T1 (e.g., an interval from the initial system time instant 1 to a system time instant 5 of the LTE base station 11 depicted in FIG. 1C) according to a start scheduling time instant (e.g., the initial system time instant 1 of the LTE base station 11 depicted in FIG. 1C) and the scheduling interval length L (i.e., four time units in this embodiment). The processor 113 further decides at least one transmission time instant within the scheduling interval T1 for each of the MTC apparatuses 131, 133, 135, 137, 139 according to the transmission periods, the tolerable time shifts, the start transmission time instants, and the required resource amounts. For each of the MTC apparatuses 131, 133, 135, 137, 139, the processor 113 temporarily decides a possible transmission time instant according to the start transmission time instant and the transmission period and determines whether there are enough resource blocks available at the possible transmission time instant. If there are enough resource blocks available at the possible transmission time instant, the possible transmission time instant is the transmission time instant. Otherwise, the processor 113 decides a tolerable transmission interval according to the tolerable time shift and selects a time instant that the required resource blocks are available from the tolerable transmission interval as the transmission time instant.

As shown in FIG. 1C, the processor 113 determines that the resource block A provided at the time instant 1 and the time instant 4 (i.e., the system time instant 1 and the system time instant 4) within the scheduling interval T1 that can be allocated to the MTC apparatus 131; hence, the processor 113 decides that the time instant 1 and the time instant 4 within the scheduling interval T1 are the transmission time instants of the MTC apparatus 131. The processor 113 determines that the resource block B provided at the time instant 2 (i.e., the system time instant 2) within the scheduling interval T1 can be allocated to the MTC apparatus 133; hence, the processor 113 decides that the time instant 2 within the scheduling interval T1 is the transmission time instant of the MTC apparatus 133. The processor 113 determines that the resource block C provided at the time instant 1 and the time instant 3 (i.e., the system time instant 1 and the system time instant 3) within the scheduling interval T1 can be allocated to the MTC apparatus 135; hence, the processor 113 decides that the time instant 1 and the time instant 3 within the scheduling interval T1 are the transmission time instants of the MTC apparatus 135. The processor 113 determines that the resource block D provided at the time instant 2 and the time instant 4 (i.e., the system time instant 2 and the system time instant 4) within the scheduling interval T1 can be allocated to the MTC apparatus 137; hence, the processor 113 decides that the time instant 2 and the time instant 4 within the scheduling interval T1 are the transmission time instants of the MTC apparatus 137. The processor 113 determines that the resource block E provided at the time instant 3 (i.e., the system time instant 3) within the scheduling interval T1 can be allocated to the MTC apparatus 139; hence, the processor 113 decides that the time instant 3 within the scheduling interval T1 is the transmission time instant of the MTC apparatus 139.

Then, the transceiver 111 transmits each of the at least one transmission time instant to the corresponding MTC apparatus. Specifically, the transceiver 111 transmits a signal 140 comprising the time instant 1 and the time instant 4 within the scheduling interval T1 to the MTC apparatus 131, transmits a signal 142 comprising the time instant 2 within the scheduling interval T1 to the MTC apparatus 133, transmits a signal 144 comprising the time instant 1 and the time instant 3 within the scheduling interval T1 to the MTC apparatus 135, transmits a signal 146 comprising the time instant 2 and the time instant 4 within the scheduling interval T1 to the MTC apparatus 137, and transmits a signal 148 comprising the time instant 3 within the scheduling interval T1 to the MTC apparatus 139. Then, the MTC apparatuses 131, 133, 135, 137, 139 transmit data according to the at least one transmission time instant comprised in the signals 140, 142, 144, 146, 148 after receiving the signals 140, 142, 144, 146, 148 respectively.

After the wireless resources have been scheduled for the scheduling interval T1, the processor 113 updates the start transmission time instants and the start scheduling time instants of the MTC apparatuses 131, 133, 135, 137, 139. Specifically, the processor 113 updates the start transmission time instants of the MTC apparatuses 131, 133, 135, 137, 139 to the system time instant 7, the system time instant 5, the system time instant 5, the system time instant 6, and the system time instant 7 according to the transmission periods of the MTC apparatuses 131, 133, 135, 137, 139 respectively. Additionally, the processor 113 takes the end-up time instant of the scheduling interval T1 as a next start scheduling time instant (i.e., the system time instant 5 depicted in FIG. 1C).

The processor 113 determines that no MTC apparatus moves into or out of the LTE wireless network system 1 within the scheduling interval T1 (i.e., all the MTC apparatuses 131, 133, 135, 137, 139 are still wirelessly connected to the LTE base station and no other MTC apparatus starts to be wirelessly connected to the LTE base station within the scheduling interval T1). Based on this determination result, the processor 113 decides the scheduling interval T2 (e.g., an interval from the system time instant 5 to the system time instant 9 depicted in FIG. 1C) according to the updated start scheduling time instant (i.e., the system time instant 5 depicted in FIG. 1C) and the scheduling interval length L (which is still four time units).

Next, the processor 113 decides at least one transmission time instant within the scheduling interval T2 for each of the MTC apparatuses 131, 133, 135, 137, 139 according to the transmission periods, the tolerable time shifts, the updated start transmission time instants (i.e., the system time instant 7, the system time instant 5, the system time instant 5, the system time instant 6, and the time instant 7, which are equivalent to the time instant 3, the time instant 1, the time instant 1, the time instant 2, and the time instant 3 within the scheduling interval T2), and the required resource amounts of the MTC apparatuses 131, 133, 135, 137, 139. For each of the MTC apparatuses 131, 133, 135, 137, 139, the processor 113 temporarily decides a possible transmission time instant according to the start transmission time instant and the transmission period and determines whether there are enough resource blocks available at the possible transmission time instant. If there are enough resource blocks available at the possible transmission time instant, the possible transmission time instant may be taken as the transmission time instant. Otherwise, the processor 113 decides a tolerable transmission interval according to the tolerable time shift and selects the time instant that the required resource blocks are available from the tolerable transmission interval as the transmission time instant.

As shown in FIG. 1C, the processor 113 determines that the resource block A provided at the time instant 3 (i.e., the system time instant 7) within the scheduling interval T2 can be allocated to the MTC apparatus 131; hence, the processor 113 decides that the time instant 3 within the scheduling interval T2 is the transmission time instant of the MTC apparatus 131. Through similar determination procedures, the processor 113 decides that the time instant 1 and the time instant 4 (i.e., the system time instant 5 and the system time instant 8) within the scheduling interval T2 are the transmission time instants of the MTC apparatus 133, decides that the time instant 1 and the time instant 3 (i.e., the system time instant 5 and the system time instant 7) within the scheduling interval T2 are the transmission time instants of the MTC apparatus 135, and decides that the time instant 2 and the time instant 4 (i.e., the system time instant 6 and the system time instant 8) within the scheduling interval T2 are the transmission time instants of the MTC apparatus 137.

The transmission time instant of the MTC apparatus 139 should be particularly described. For the MTC apparatus 139, the processor 113 temporarily decides a possible transmission time instant (i.e., the system time instant 7, which is equivalent to the time instant 3 within the scheduling interval T2). Since the required resource amount of the MTC apparatus 139 is three resource blocks, the processor 113 determines that the available resource blocks at the possible transmission time instant are not enough for the MTC apparatus 139 (i.e. the required resource blocks of the MTC apparatus 139 are not available at the possible transmission time instant). Thus, the processor 113 decides a tolerable transmission interval according to the tolerable time shift (i.e., one time unit before and after the possible transmission time instant) of the MTC apparatus 139. Since there are enough available resource blocks at the system time instant 6 within the tolerable transmission interval (which is equivalent to the time instant 2 within the scheduling interval T2), the processor 113 decides that the system time instant 6 (which is equivalent to the time instant 2 within the scheduling interval T2) is the transmission time instant of the MTC apparatus 139.

Similarly, after the processor 113 decides the transmission time instants of the MTC apparatuses 131, 133, 135, 137, 139 within the scheduling interval T2, the transceiver 111 transmits each of the at least one transmission time instant to the corresponding MTC apparatus so that the MTC apparatuses 131, 133, 135, 137, 139 transmit data according to the corresponding at least one transmission time instant within the scheduling interval T2.

Similarly, after the wireless resources for the scheduling interval T2 has been scheduled, the processor 113 updates the start transmission time instants and the start scheduling time instants of the MTC apparatuses 131, 133, 135, 137, 139 again and schedules the wireless resources for other subsequent scheduling intervals again.

It shall be appreciated that according to the technology disclosed in this embodiment, if any MTC apparatus moves into or moves out of the LTE wireless network system 1 (i.e., any of the MTC apparatuses 131, 133, 135, 137, 139 stops the wireless connection with the LTE base station 11 or some other MTC apparatus starts to be wirelessly connected to the LTE base station) within any scheduling interval, then the processor 113 updates the scheduling interval length L again according to the transmission periods of the MTC apparatuses currently wirelessly connected to the LTE wireless network system 1. For example, the processor determines that one (e.g., the MTC apparatus 131) of the MTC apparatuses 131, 133, 135, 137, 139 starts to be wirelessly connected to the transceiver 111 within a scheduling interval (not depicted) which is immediately adjacent to and earlier than the scheduling interval T1. Based on this determination result, the processor 113 updates the original scheduling interval length L according to the transmission periods of the MTC apparatuses currently wirelessly connected to the LTE wireless network system 1. Afterwards, the processor 113 further decides a next scheduling interval according to the start scheduling time instant and the updated scheduling interval length L and decides at least one transmission time instant within the next scheduling interval for each of the MTC apparatuses according to the transmission periods, the tolerable time shifts, the start transmission time instants, and the required resource amounts of the MTC apparatuses currently wirelessly connected to the LTE wireless network system 1.

According to the above descriptions, for the MTC apparatuses 131, 133, 135, 137, 139 served by the LTE base station 11, the LTE base station 11 schedules the wireless resources according to the transmission periods, the tolerable time shifts, the start transmission time instants, and the required resource amounts of the MTC apparatuses 131, 133, 135, 137, 139 in advance. For each of the MTC apparatuses 131, 133, 135, 137, 139, the processor 113 temporarily decides a possible transmission time instant according to the start transmission time instant and the transmission period and determines whether there are enough available resource blocks at the possible transmission time instant. If there are enough available resource blocks at the possible transmission time instant, the possible transmission time instant is the transmission time instant. Otherwise, the processor 113 decides a tolerable transmission interval according to the tolerable time shift and selects the time instant that the required resource blocks are available from the tolerable transmission interval as the transmission time instant. Then, the MTC apparatuses 131, 133, 135, 137, 139 transmit data according to the transmission time instants decided by the LTE base station 11. Since the LTE base station 11 decides the transmission time instants for the MTC apparatuses 131, 133, 135, 137, 139 in advance, the MTC apparatuses 131, 133, 135, 137, 139 no longer have to request resources from the LTE base station 11 via a contention-based random access procedure. Thus, the shortcomings of the prior art have been overcome.

FIGS. 1A-1C illustrate the second embodiment of the present invention. The main operation mechanism of the second embodiment is similar to that of the first embodiment. Nevertheless, the second embodiment decides the transmission time instants within each scheduling interval for the MTC apparatuses 131, 133, 135, 137, 139 in a more specific approach. Specifically, in this embodiment, the processor 113 decides the transmission time instants within each scheduling interval for each of the MTC apparatuses 131, 133, 135, 137, 139 by executing the following operations (a) to (e).

Firstly, the operation (a) is executed by the processor 113 to decide a processing order of the MTC apparatuses according to an ascending order of the start transmission time instants of the MTC apparatuses 131, 133, 135, 137, 139. Next, the operation (b) is executed by the processor 113 to select one of the MTC apparatuses as a current MTC apparatus (i.e., the MTC apparatus that is going to be scheduled) according to the processing order.

The operation (c) is executed by the processor 113 to decide a tolerable transmission interval according to the start transmission time instant and the tolerable time shift corresponding to the current MTC apparatus. Next, the operation (d) is executed by the processor 113 to select a time instant within the tolerable transmission interval as one of the at least one transmission time instant of the current MTC apparatus according to the required resource amount of the current MTC apparatus. For example, the processor 113 may select the earliest time instant that the required resource amount is available within the tolerable transmission interval as one of the at least one transmission time instant of the current MTC apparatus. If the processor 113 determines that the required resource amount is not available at any of the time instants within the tolerable transmission interval, the processor 113 takes the start transmission time instant as one of the at least one transmission time instant of the current MTC apparatus.

Afterwards, the operation (e) is executed by the processor 113 to update the start transmission time instant of the current MTC apparatus and the processing order. Specifically, when the processor 113 determines that a sum of the start transmission time instant and the transmission period of the current MTC apparatus is greater than the scheduling interval length, the processor 113 updates the start transmission time instant by a value equal to the start transmission time instant plus the transmission period and minus the scheduling interval length and excludes the current MTC apparatus from the processing order. When the processor 113 determines that a sum of the start transmission time instant and the transmission period of the current MTC apparatus is not greater than the scheduling interval length, the processor 113 updates the start transmission time instant by a value equal to the start transmission time instant plus the transmission period and updates the processing order according to the updated start transmission time instant. The processor 113 repeats the aforesaid operations (a) to (e) according to the updated processing order until all the MTC apparatuses scheduled in the processing order are completely processed.

For better understanding, the aforesaid operations (a) to (e) will be further explained with reference to FIG. 1C. The start transmission instants of the MTC apparatuses 131, 133, 135,

137, 139 are respectively the time instant 1, the time instant 2, the time instant 1, the time instant 2, and the time instant 3 within the scheduling interval T1. When the processor 113 executes the operation (a) for determining the processing order according to an ascending order of the start time instants, the determined processing order is: the MTC apparatus 131, the MTC apparatus 135, the MTC apparatus 133, the MTC apparatus 137, and the MTC apparatus 139. In the operation (b), the processor 113 selects the MTC apparatus 131 as the current MTC apparatus according to the processing order. Next, in operation (c), the processor 113 decides the tolerable transmission interval of the current MTC apparatus. Then, in operation (d), the processor 113 selects the time instant 1 within the scheduling interval T1 as the transmission time instant. Afterwards, in operation (e), the processor 113 determines that the sum of the start transmission time instant and the transmission period is not greater than the scheduling interval length (i.e., one plus three is not greater than four), so the processor 113 updates the start transmission time instant of the current MTC apparatus (i.e., the MTC apparatus 131) by a value equal to the start transmission time instant plus the transmission period (i.e. the time instant 4). Then, the processor 113 updates the processing order according to the updated start transmission time instant of the MTC apparatus 131. That is, the updated processing order is as follows: the MTC apparatus 135, the MTC apparatus 133, the MTC apparatus 137, the MTC apparatus 139 and the MTC apparatus 131.

Based on the descriptions, people with ordinary skill in the art are able to understand how the processor 113 repeats the aforesaid operations (a) to (e) until all the MTC apparatuses listed in the processing order are completely processed. Thus, the details are not be further described herein.

After all the MTC apparatuses listed in the processing order have been completely processed, this means that scheduling for a certain scheduling interval is finished by the processor 113. In other words, the processor 113 has decided the transmission time instants within the scheduling interval for the MTC apparatuses 131, 133, 135, 137, 139. Next, the transceiver 111 may transmit each of the transmission time instants to the corresponding MTC apparatus so that the MTC apparatuses 131, 133, 135, 137, 139 transmit data within the scheduling interval according to the corresponding transmission time instant.

Figure 2A:
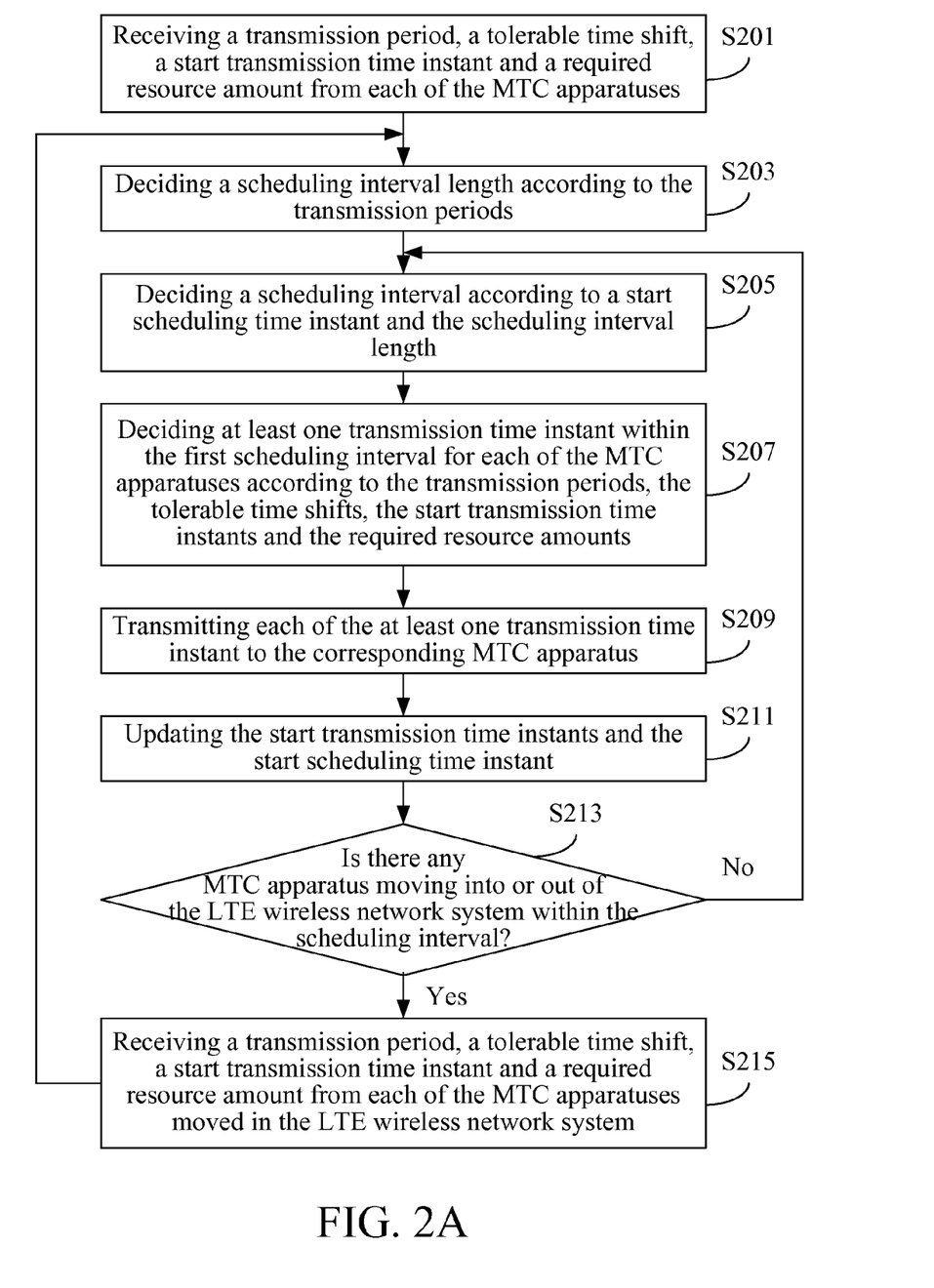
FIG. 2A depicts a flowchart diagram of a third embodiment.

The third embodiment of the present invention is a wireless resource scheduling method and a flowchart diagram of which is depicted in FIG. 2A. The wireless resource scheduling method is for use in an LTE base station (e.g., the LTE base station 11 described in the first embodiment and the second embodiment) and the LTE base station is wirelessly connected to a plurality of MTC apparatuses.

First, the wireless resource scheduling method executes step S201 to receive a transmission period, a tolerable time shift, a start transmission time instant, and a required resource amount from each of the MTC apparatuses. Next, step S203 is executed to decide a scheduling interval length according to the transmission periods. For example, the scheduling interval length may be equal to the greatest transmission period. Then, step S205 is executed to decide a scheduling interval according to a start scheduling time instant and the scheduling interval length. Afterwards, step S207 is executed to decide at least one transmission time instant within the scheduling interval for each of the MTC apparatuses according to the transmission periods, the tolerable time shifts, the start transmission time instants, and the required resource amounts. Then, step S209 is executed to transmit each of the at least one transmission time instant to the corresponding MTC apparatus so that each of the MTC apparatuses transmits a datum according to the corresponding at least one transmission time instant within the scheduling interval. Next, step S211 is executed to update the start transmission time instants and the start scheduling time instant.

Afterwards, step S213 is executed to determine whether any MTC apparatus moves into or out of the LTE wireless network system within the scheduling interval (i.e., to determine whether all the MTC apparatuses are still wirelessly connected to the LTE base station within the scheduling interval and no other MTC apparatus starts to be wirelessly connected to the LTE base station within the scheduling interval). If the determination result of the step S213 is "no," then steps S205 to S213 are repeated according to the updated start transmission time instants and the start scheduling time instant; otherwise, step S215 is executed to receive a transmission period, a tolerable time shift, a start transmission time instant, and a required resource amount from each of the MTC apparatuses that have moved in the LTE wireless network system. It shall be appreciated that if the determination result of the step S213 is "yes" and the cause of this determination result is that some MTC apparatus moves out of the LTE wireless network system within the scheduling interval instead of some MTC apparatus moving into the LTE wireless network system within the scheduling interval, then step S215 may be omitted. Afterwards, steps S203 to S213 are repeated.

Figure 2B:
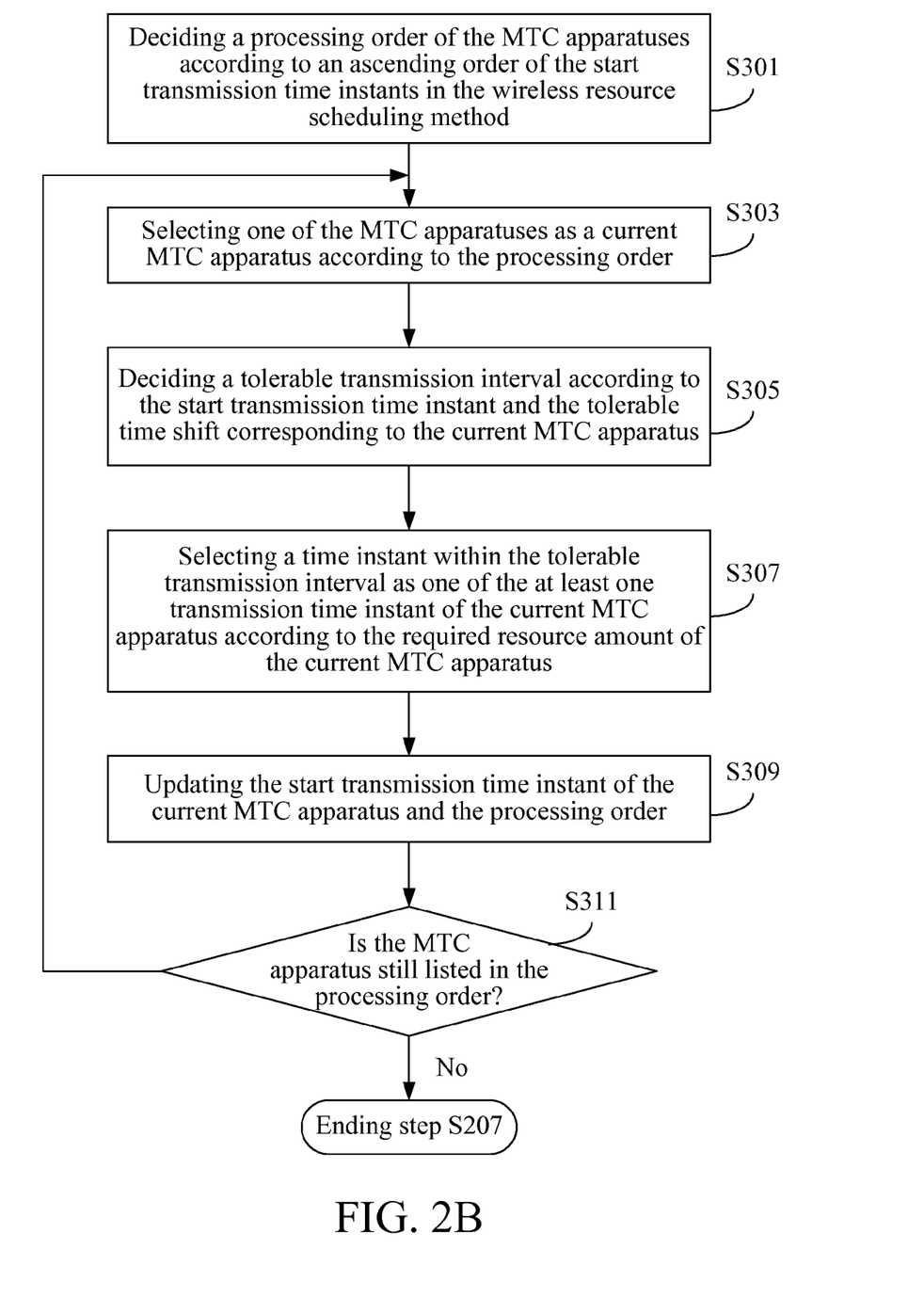
FIG. 2B depicts a flowchart diagram of some implementations of step S207.

It should be appreciated that step S207 may be accomplished through the process flow depicted in FIG. 2B in some embodiments. Specifically, the wireless resource scheduling method executes step S301 to decide a processing order of the MTC apparatuses in an ascending order of the start transmission time instants. Next, the wireless resource scheduling method executes step S303 to select one of the MTC apparatuses as a current MTC apparatus according to the processing order. Afterwards, the wireless resource scheduling method executes step S305 to decide a tolerable transmission interval according to the start transmission time instant and the tolerable time shift corresponding to the current MTC apparatus.

Next, the wireless resource scheduling method executes step S307 to select a time instant within the tolerable transmission interval as one of the at least one transmission time instants of the current MTC apparatus according to the required resource amount of the current MTC apparatus. Specifically, the earliest time instant that the required resource amount is available within the tolerable transmission interval may be selected as one of the at least one transmission time instant of the current MTC apparatus in the step S307. If there is no time instant at which the required resource amount is available within the tolerable transmission interval, then the start transmission time instant is taken as one of the at least one transmission time instant of the current MTC apparatus in step S307.

Afterwards, the wireless resource scheduling method executes step S309 to update the start transmission time instant of the current MTC apparatus and the processing order. Specifically, if the sum of the start transmission time instant and the transmission period of the current MTC apparatus is greater than the scheduling interval length, the start transmission time instant is updated to a value equal to the start transmission time instant plus the transmission period and minus the scheduling interval length. The current MTC apparatus is excluded from the processing order in the step S309. If the sum of the start transmission time instant and the transmission period of the current MTC apparatus is not greater than the scheduling interval length, the start transmission time instant is updated to a value equal to the start transmission time instant plus the transmission period, and the processing order is updated according to the updated start transmission time instant in step S309.

Afterwards, the wireless resource scheduling method executes step S311 to determine whether the MTC apparatus is listed in the processing order. If the determination result of the step S311 is "yes," then steps S303 to S311 are repeated; otherwise, it means that the step S207 has been completed.

In addition to the aforesaid steps, the third embodiment can also execute all the operations, functions, and steps set forth in the first embodiment and the second embodiment. The method in which the third embodiment executes these operations, functions, and steps will be readily appreciated by those of ordinary skill in the art based on the explanation of the first embodiment and the second embodiment, and thus will not be further described herein.

As can be known from the descriptions of the aforesaid embodiments, for a plurality of MTC apparatuses served by an LTE base station, the present invention schedules the wireless resources in advance according to the transmission periods, the tolerable time shifts, the start transmission time instants, and the required resource amounts of the MTC apparatuses. Then, the MTC apparatuses transmit data according to the result of wireless resource scheduling. Since the present invention schedules the wireless resources for the MTC apparatuses in advance, it is unnecessary for the MTC apparatuses to request resources from the LTE base station via a contention-based random access procedure, thus overcoming the shortcomings of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A Long Term Evolution (LTE) base station, comprising:
   a transceiver, being wirelessly connected to a plurality of Machine Type Communication (MTC) apparatuses and configured to receive a transmission period, a tolerable time shift, a start transmission time instant, and a required resource amount from each of the MTC apparatuses; and
   a processor, being electrically connected to the transceiver and configured to decide a scheduling interval length according to the transmission periods, decide a first scheduling interval according to a start scheduling time instant and the scheduling interval length, and decide at least one transmission time instant within the first scheduling interval for each of the MTC apparatuses according to the transmission periods, the tolerable time shifts, the start transmission time instants, and the required resource amounts;
   wherein the transceiver transmits each of the at least one transmission time instant to the corresponding MTC apparatus wherein each of the MTC apparatuses transmits a first datum according to the corresponding at least one transmission time instant within the first scheduling interval.

2. The LTE base station of claim 1, wherein the scheduling interval length is equal to the greatest transmission period.

3. The LTE base station of claim 1, wherein the processor determines that one of the MTC apparatuses starts to be wirelessly connected to the transceiver within a second scheduling interval, the second scheduling interval is adjacent to and earlier than the first scheduling interval, wherein the scheduling interval length, the first scheduling interval, and the at least one transmission time instant within the first scheduling interval of each of the MTC apparatuses are decided after the processor determines that one of the MTC apparatuses starts to be wirelessly connected to the transceiver within the second scheduling interval.

4. The LTE base station of claim 1, wherein the processor updates the start transmission time instants and the start scheduling time instant, the processor determines that the MTC apparatuses are still wirelessly connected to the transceiver and no other MTC apparatus starts to be wirelessly connected to the transceiver within the first scheduling interval, the processor decides a second scheduling interval according to the updated start scheduling time instant and the scheduling interval length, and the processor decides at least one transmission time instant within the second scheduling interval for each of the MTC apparatuses according to the transmission periods, the tolerable time shifts, the updated start transmission time instants, and the required resource amounts;
   wherein the transceiver transmits each of the at least one transmission time instant of the second scheduling interval to the corresponding MTC apparatus wherein each of the MTC apparatuses transmits a second datum according to the corresponding at least one transmission time instant within the second scheduling interval.

5. The LTE base station of claim 1, wherein the processor decides the at least one transmission time instant within the first scheduling interval for each of the MTC apparatuses by executing the following operations:
   (a) deciding a processing order of the MTC apparatuses according to an ascending order of the start transmission time instants,
   (b) selecting one of the MTC apparatuses as a current MTC apparatus according to the processing order,
   (c) deciding a tolerable transmission interval according to the start transmission time instant and the tolerable time shift corresponding to the current MTC apparatus,
   (d) selecting a time instant within the tolerable transmission interval as one of the at least one transmission time instant of the current MTC apparatus according to the required resource amount of the current MTC apparatus,
   (e) updating the start transmission time instant of the current MTC apparatus and the processing order, and
   (f) repeating the operations (a) to (e) according to the processing order.

6. The LTE base station of claim 5, wherein when executing the operation (d), the processor selects the earliest time instant that the required resource amount is available within the tolerable transmission interval as one of the at least one transmission time instant of the current MTC apparatus.

7. The LTE base station of claim 5, wherein when executing the operation (d), the processor takes the start transmission time instant as one of the at least one transmission time instant of the current MTC apparatus.

8. The LTE base station of claim 5, wherein when executing the operation (e), the processor determines that a sum of the start transmission time instant and the transmission period of the current MTC apparatus is greater than the scheduling interval length, updates the start transmission time instant by a value equal to the start transmission time instant plus the transmission period and minus the scheduling interval length, and excludes the current MTC apparatus from the processing order.

9. The LTE base station of claim 5, wherein when executing the operation (e), the processor determines that a sum of the start transmission time instant and the transmission period of the current MTC apparatus is not greater than the scheduling interval length, updates the start transmission time instant by a value equal to the start transmission time instant plus the transmission period, and updates the processing order according to the updated start transmission time instant.

10. A wireless resource scheduling method for an LTE base station, the LTE base station being wirelessly connected to a plurality of MTC apparatuses, the wireless resource scheduling method comprising the steps of:
(a) receiving a transmission period, a tolerable time shift, a start transmission time instant, and a required resource amount from each of the MTC apparatuses;
(b) deciding a scheduling interval length according to the transmission periods;
(c) deciding a first scheduling interval according to a start scheduling time instant and the scheduling interval length;
(d) deciding at least one transmission time instant within the first scheduling interval for each of the MTC apparatuses according to the transmission periods, the tolerable time shifts, the start transmission time instants, and the required resource amounts; and
(e) transmitting each of the at least one transmission time instant to the corresponding MTC apparatus wherein each of the MTC apparatuses transmits a first datum according to the corresponding at least one transmission time instant within the first scheduling interval.

11. The wireless resource scheduling method of claim 10, wherein the scheduling interval length is equal to the greatest transmission period.

12. The wireless resource scheduling method of claim 10, further comprising:
(f) determining that one of the MTC apparatuses starts to be wirelessly connected to the LTE base station within a second scheduling interval, wherein the second scheduling interval is adjacent to and earlier than the first scheduling interval,
wherein the step (b), the step (c), the step (d), and the step (e) are executed after the step (f).

13. The wireless resource scheduling method of claim 10, further comprising:
updating the start transmission time instants and the start scheduling time instant;
determining that the MTC apparatuses are still wirelessly connected to the LTE base station and no other MTC apparatus starts to be wirelessly connected to the LTE base station within the first scheduling interval;
deciding a second scheduling interval according to the updated start scheduling time instant and the scheduling interval length;
deciding at least one transmission time instant within the second scheduling interval for each of the MTC apparatuses according to the transmission periods, the tolerable time shifts, the updated start transmission time instants, and the required resource amounts; and
transmitting each of the at least one transmission time instant of the second scheduling interval to the corresponding MTC apparatus wherein each of the MTC apparatuses transmits a second datum according to the corresponding at least one transmission time instant within the second scheduling interval.

14. The wireless resource scheduling method of claim 10, wherein the step (d) includes:
(d1) deciding a processing order of the MTC apparatuses according to an ascending order of the start transmission time instants;
(d2) selecting one of the MTC apparatuses as a current MTC apparatus according to the processing order;
(d3) deciding a tolerable transmission interval according to the start transmission time instant and the tolerable time shift corresponding to the current MTC apparatus;
(d4) selecting a time instant within the tolerable transmission interval as one of the at least one transmission time instant of the current MTC apparatus according to the required resource amount of the current MTC apparatus;
(d5) updating the start transmission time instant of the current MTC apparatus and the processing order; and
(d6) repeating the steps (a) to (e) according to the processing order.

15. The wireless resource scheduling method of claim 14, wherein the step (d4) selects the earliest time instant that the required resource amount is available within the tolerable transmission interval as one of the at least one transmission time instant of the current MTC apparatus.

16. The wireless resource scheduling method of claim 14, wherein the step (d4) takes the start transmission time instant as one of the at least one transmission time instant of the current MTC apparatus.

17. The wireless resource scheduling method of claim 14, wherein the step (d5) determines that a sum of the start transmission time instant and the transmission period of the current MTC apparatus is greater than the scheduling interval length, updates the start transmission time instant by a value equal to the start transmission time instant plus the transmission period and minus the scheduling interval length, and excludes the current MTC apparatus from the processing order.

18. The wireless resource scheduling method of claim 14, wherein the step (d5) determines that a sum of the start transmission time instant and the transmission period of the current MTC apparatus is not greater than the scheduling interval length, updates the start transmission time instant by a value equal to the start transmission time instant plus the transmission period, and updates the processing order according to the updated start transmission time instant.

* * * * *